(12) United States Patent
Håkansson et al.

(10) Patent No.: US 8,887,468 B2
(45) Date of Patent: Nov. 18, 2014

(54) MECHANICAL LOCKING SYSTEM FOR BUILDING PANELS

(75) Inventors: Niclas Håkansson, Viken (SE); Darko Pervan, Viken (SE)

(73) Assignee: Valinge Flooring Technology AB, Viken (SE)

( * ) Notice: Subject to any disclaimer, the term of this patent is extended or adjusted under 35 U.S.C. 154(b) by 0 days.

(21) Appl. No.: 13/464,512

(22) Filed: May 4, 2012

(65) Prior Publication Data

US 2012/0279161 A1 Nov. 8, 2012

Related U.S. Application Data

(60) Provisional application No. 61/483,444, filed on May 6, 2011.

(51) Int. Cl.
| | |
|---|---|
| E04B 1/38 | (2006.01) |
| E04B 2/00 | (2006.01) |
| A47B 47/00 | (2006.01) |
| F16B 12/46 | (2006.01) |
| F16B 12/12 | (2006.01) |
| F16B 5/06 | (2006.01) |
| F16B 12/26 | (2006.01) |
| F16B 12/44 | (2006.01) |
| E04B 1/61 | (2006.01) |

(52) U.S. Cl.
CPC ............. *F16B 12/125* (2013.01); *F16B 5/0614* (2013.01); *F16B 12/26* (2013.01); *F16B 12/44* (2013.01); *E04B 1/6141* (2013.01); *E04B 2001/6195* (2013.01)
USPC .......... 52/586.1; 52/285.1; 312/263; 403/403

(58) Field of Classification Search
USPC .............. 525/285.1, 588.1, 582.1, 586.1; 312/257.1, 263, 265.5; 403/403
See application file for complete search history.

(56) References Cited

U.S. PATENT DOCUMENTS

| | | |
|---|---|---|
| 87,853 A | 3/1869 | Kappes |
| 108,068 A | 10/1870 | Utley |
| 124,228 A | 3/1872 | Stuart |
| 213,740 A | 4/1879 | Conner |
| 274,354 A | 3/1883 | McCarthy et al. |
| 316,176 A | 4/1885 | Ransom |
| 634,581 A * | 10/1899 | Miller ........................... 403/327 |
| 861,911 A * | 7/1907 | Stewart ......................... 312/263 |
| 881,673 A * | 3/1908 | Ellison ............................ 217/65 |
| 1,194,636 A | 8/1916 | Joy |
| 1,723,306 A | 8/1929 | Sipe |

(Continued)

FOREIGN PATENT DOCUMENTS

| | | |
|---|---|---|
| CA | 2456513 A1 | 2/2003 |
| CN | 201588375 U | 9/2010 |

(Continued)

OTHER PUBLICATIONS

U.S. Appl. No. 13/577,042, Pervan.

(Continued)

*Primary Examiner* — Ryan Kwiecinski
(74) *Attorney, Agent, or Firm* — Buchanan Ingersoll & Rooney P.C.

(57) ABSTRACT

Panels are shown which are provided with a mechanical locking system allowing perpendicular connection with a snap action.

16 Claims, 11 Drawing Sheets

(56) References Cited

U.S. PATENT DOCUMENTS

| | | | |
|---|---|---|---|
| 1,743,492 A | 1/1930 | Sipe | |
| 1,809,393 A | 6/1931 | Rockwell | |
| 1,902,716 A | 3/1933 | Newton | |
| 1,954,242 A * | 4/1934 | Heppenstall | 403/381 |
| 2,026,511 A | 12/1935 | Storm | |
| 2,204,675 A | 6/1940 | Grunert | |
| 2,277,758 A | 3/1942 | Hawkins | |
| 2,362,904 A * | 11/1944 | Kramer | 217/65 |
| 2,430,200 A | 11/1947 | Wilson | |
| 2,496,184 A * | 1/1950 | Von Canon | 144/354 |
| 2,497,837 A | 2/1950 | Nelson | |
| 2,596,280 A | 5/1952 | Nystrom | |
| 2,732,706 A | 1/1956 | Friedman | |
| 2,740,167 A | 4/1956 | Rowley | |
| 2,863,185 A | 12/1958 | Riedi | |
| 2,865,058 A | 12/1958 | Andersson | |
| 2,872,712 A | 2/1959 | Brown et al. | |
| 2,889,016 A | 6/1959 | Warren | |
| 3,023,681 A | 3/1962 | Worson | |
| 3,077,703 A | 2/1963 | Bergstrom | |
| 3,099,110 A | 7/1963 | Spaight | |
| 3,147,522 A | 9/1964 | Schumm | |
| 3,195,968 A * | 7/1965 | Freeman | 312/263 |
| 3,271,787 A | 9/1966 | Clary | |
| 3,284,152 A * | 11/1966 | Schorghuber | 312/257.1 |
| 3,325,585 A | 6/1967 | Brenneman | |
| 3,347,610 A * | 10/1967 | Pilliod | 312/263 |
| 3,378,958 A | 4/1968 | Parks et al. | |
| 3,396,640 A | 8/1968 | Fujihara | |
| 3,410,441 A * | 11/1968 | Rhyne | 220/4.28 |
| 3,512,324 A | 5/1970 | Reed | |
| 3,517,927 A | 6/1970 | Kennel | |
| 3,526,071 A | 9/1970 | Watanabe | |
| 3,535,844 A | 10/1970 | Glaros | |
| 3,572,224 A | 3/1971 | Perry | |
| 3,579,941 A | 5/1971 | Tibbals | |
| 3,720,027 A | 3/1973 | Christensen | |
| 3,722,379 A | 3/1973 | Koester | |
| 3,742,669 A | 7/1973 | Mansfeld | |
| 3,760,547 A | 9/1973 | Brenneman | |
| 3,760,548 A | 9/1973 | Sauer et al. | |
| 3,778,954 A | 12/1973 | Meserole | |
| 3,849,235 A | 11/1974 | Gwynne | |
| 3,885,845 A * | 5/1975 | Krieks | 312/265 |
| 3,919,820 A | 11/1975 | Green | |
| 3,950,915 A | 4/1976 | Cole | |
| 4,007,994 A | 2/1977 | Brown | |
| 4,030,852 A | 6/1977 | Hein | |
| 4,064,571 A | 12/1977 | Phipps | |
| 4,080,086 A | 3/1978 | Watson | |
| 4,082,129 A | 4/1978 | Morelock | |
| 4,089,614 A * | 5/1978 | Harley | 403/231 |
| 4,100,710 A | 7/1978 | Kowallik | |
| 4,107,892 A | 8/1978 | Bellem | |
| 4,113,399 A | 9/1978 | Hansen, Sr. et al. | |
| 4,116,510 A * | 9/1978 | Franco | 312/257.1 |
| 4,169,688 A | 10/1979 | Toshio | |
| 4,196,554 A | 4/1980 | Anderson | |
| 4,227,430 A | 10/1980 | Jansson et al. | |
| 4,299,070 A | 11/1981 | Oltmanns | |
| 4,304,083 A | 12/1981 | Anderson | |
| 4,426,820 A | 1/1984 | Terbrack | |
| 4,447,172 A | 5/1984 | Galbreath | |
| 4,512,131 A | 4/1985 | Laramore | |
| 4,599,841 A | 7/1986 | Haid | |
| 4,648,165 A | 3/1987 | Whitehorse | |
| 4,883,331 A * | 11/1989 | Mengel | 312/195 |
| 4,886,326 A * | 12/1989 | Kuzyk | 312/257.1 |
| 4,909,581 A * | 3/1990 | Haheeb | 312/263 |
| 5,007,222 A | 4/1991 | Raymond | |
| 5,071,282 A | 12/1991 | Brown | |
| 5,148,850 A | 9/1992 | Urbanick | |
| 5,173,012 A | 12/1992 | Ortwein et al. | |
| 5,182,892 A | 2/1993 | Chase | |
| 5,247,773 A | 9/1993 | Weir | |
| 5,272,850 A | 12/1993 | Mysliwiec et al. | |
| 5,344,700 A | 9/1994 | McGath et al. | |
| 5,348,778 A | 9/1994 | Knipp et al. | |
| 5,465,546 A | 11/1995 | Buse | |
| 5,475,960 A * | 12/1995 | Lindal | 52/478 |
| 5,485,702 A | 1/1996 | Sholton | |
| 5,527,103 A * | 6/1996 | Pittman | 312/263 |
| 5,548,937 A | 8/1996 | Shimonohara | |
| 5,598,682 A | 2/1997 | Haughian | |
| 5,618,602 A | 4/1997 | Nelson | |
| 5,634,309 A | 6/1997 | Polen | |
| 5,658,086 A * | 8/1997 | Brokaw et al. | 403/327 |
| 5,671,575 A | 9/1997 | Wu | |
| 5,694,730 A | 12/1997 | Del Rincon et al. | |
| 5,755,068 A | 5/1998 | Ormiston | |
| 5,893,617 A * | 4/1999 | Lee | 312/263 |
| 5,899,038 A | 5/1999 | Stroppiana | |
| 5,950,389 A * | 9/1999 | Porter | 52/586.1 |
| 5,970,675 A | 10/1999 | Schray | |
| 6,006,486 A | 12/1999 | Moriau et al. | |
| 6,029,416 A | 2/2000 | Andersson | |
| 6,052,960 A | 4/2000 | Yonemura | |
| 6,065,262 A | 5/2000 | Motta | |
| 6,173,548 B1 | 1/2001 | Hamar et al. | |
| 6,182,410 B1 | 2/2001 | Pervan | |
| 6,216,409 B1 | 4/2001 | Roy et al. | |
| 6,314,701 B1 | 11/2001 | Meyerson | |
| 6,363,677 B1 | 4/2002 | Chen et al. | |
| 6,385,936 B1 | 5/2002 | Schneider | |
| 6,418,683 B1 | 7/2002 | Martensson et al. | |
| 6,446,413 B1 | 9/2002 | Gruber | |
| 6,449,918 B1 | 9/2002 | Nelson | |
| 6,490,836 B1 | 12/2002 | Moriau et al. | |
| 6,505,452 B1 | 1/2003 | Hannig | |
| 6,553,724 B1 | 4/2003 | Bigler | |
| 6,591,568 B1 | 7/2003 | Pålsson | |
| 6,601,359 B2 | 8/2003 | Olofsson | |
| 6,617,009 B1 | 9/2003 | Chen et al. | |
| 6,647,689 B2 | 11/2003 | Pletzer | |
| 6,647,690 B1 | 11/2003 | Martensson | |
| 6,651,400 B1 | 11/2003 | Murphy | |
| 6,670,019 B2 | 12/2003 | Andersson | |
| 6,685,391 B1 | 2/2004 | Gideon | |
| 6,763,643 B1 | 7/2004 | Martensson | |
| 6,766,622 B1 | 7/2004 | Thiers | |
| 6,769,219 B2 | 8/2004 | Schwitte et al. | |
| 6,769,835 B2 | 8/2004 | Stridsman | |
| 6,804,926 B1 | 10/2004 | Eisermann | |
| 6,827,028 B1 * | 12/2004 | Callaway | 108/158.12 |
| 6,854,235 B2 | 2/2005 | Martensson | |
| 6,862,857 B2 | 3/2005 | Tychsen | |
| 6,865,855 B2 | 3/2005 | Knauseder | |
| 6,874,291 B1 | 4/2005 | Weber | |
| 6,880,307 B2 | 4/2005 | Schwitte et al. | |
| 6,948,716 B2 | 9/2005 | Drouin | |
| 7,021,019 B2 | 4/2006 | Knauseder | |
| 7,040,068 B2 | 5/2006 | Moriau et al. | |
| 7,051,486 B2 | 5/2006 | Pervan | |
| 7,108,031 B1 | 9/2006 | Secrest | |
| 7,121,058 B2 | 10/2006 | Pålsson et al. | |
| 7,137,229 B2 | 11/2006 | Pervan | |
| 7,152,383 B1 | 12/2006 | Wilkinson et al. | |
| 7,188,456 B2 | 3/2007 | Knauseder | |
| 7,219,392 B2 | 5/2007 | Mullet et al. | |
| 7,251,916 B2 | 8/2007 | Konzelmann et al. | |
| 7,257,926 B1 | 8/2007 | Kirby | |
| 7,337,588 B1 | 3/2008 | Moebus | |
| 7,377,081 B2 | 5/2008 | Ruhdorfer | |
| 7,451,535 B2 * | 11/2008 | Wells et al. | 29/412 |
| 7,451,578 B2 | 11/2008 | Hannig | |
| 7,454,875 B2 | 11/2008 | Pervan et al. | |
| 7,516,588 B2 | 4/2009 | Pervan | |
| 7,533,500 B2 | 5/2009 | Morton et al. | |
| 7,556,849 B2 | 7/2009 | Thompson et al. | |
| 7,568,322 B2 | 8/2009 | Pervan | |
| 7,584,583 B2 * | 9/2009 | Bergelin et al. | 52/588.1 |
| 7,614,197 B2 | 11/2009 | Nelson | |
| 7,617,651 B2 | 11/2009 | Grafenauer | |
| 7,621,092 B2 * | 11/2009 | Groeke et al. | 52/586.1 |

(56) References Cited

U.S. PATENT DOCUMENTS

| | | |
|---|---|---|
| 7,634,884 B2 | 12/2009 | Pervan et al. |
| 7,637,068 B2 | 12/2009 | Pervan |
| 7,654,055 B2 | 2/2010 | Ricker |
| 7,677,005 B2 | 3/2010 | Pervan |
| 7,716,889 B2 | 5/2010 | Pervan |
| 7,721,503 B2 | 5/2010 | Pervan et al. |
| 7,726,088 B2 | 6/2010 | Muehlebach |
| 7,757,452 B2 | 7/2010 | Pervan |
| 7,802,411 B2 | 9/2010 | Pervan |
| 7,806,624 B2 | 10/2010 | McLean et al. |
| 7,841,144 B2 | 11/2010 | Pervan et al. |
| 7,841,145 B2 | 11/2010 | Pervan et al. |
| 7,861,482 B2 | 1/2011 | Pervan et al. |
| 7,866,110 B2 | 1/2011 | Pervan |
| 7,908,815 B2 | 3/2011 | Pervan et al. |
| 7,930,862 B2 | 4/2011 | Bergelin et al. |
| 7,980,039 B2 | 7/2011 | Groeke |
| 7,980,041 B2 | 7/2011 | Pervan |
| 7,998,549 B2 * | 8/2011 | Susnjara ............... 428/119 |
| 8,033,074 B2 | 10/2011 | Pervan |
| 8,042,311 B2 * | 10/2011 | Pervan et al. ........... 52/586.1 |
| 8,061,104 B2 | 11/2011 | Pervan |
| 8,079,196 B2 | 12/2011 | Pervan |
| 8,112,967 B2 | 2/2012 | Pervan et al. |
| 8,171,692 B2 | 5/2012 | Pervan |
| 8,181,416 B2 | 5/2012 | Pervan et al. |
| 8,234,830 B2 | 8/2012 | Pervan et al. |
| 8,302,367 B2 | 11/2012 | Schulte |
| 8,336,272 B2 | 12/2012 | Prager et al. |
| 8,341,914 B2 | 1/2013 | Pervan et al. |
| 8,341,915 B2 | 1/2013 | Pervan et al. |
| 8,353,140 B2 | 1/2013 | Pervan et al. |
| 8,359,805 B2 | 1/2013 | Pervan et al. |
| 8,381,477 B2 | 2/2013 | Pervan et al. |
| 8,387,327 B2 * | 3/2013 | Pervan ................... 52/586.2 |
| 8,448,402 B2 | 5/2013 | Pervan et al. |
| 2001/0024707 A1 | 9/2001 | Andersson et al. |
| 2002/0031646 A1 | 3/2002 | Chen et al. |
| 2002/0046433 A1 | 4/2002 | Sellman, Jr. et al. |
| 2002/0069611 A1 | 6/2002 | Leopolder |
| 2002/0100231 A1 | 8/2002 | Miller et al. |
| 2002/0170259 A1 | 11/2002 | Ferris |
| 2002/0178674 A1 | 12/2002 | Pervan |
| 2002/0178680 A1 | 12/2002 | Martensson |
| 2003/0009971 A1 | 1/2003 | Palmberg |
| 2003/0024199 A1 | 2/2003 | Pervan et al. |
| 2003/0037504 A1 | 2/2003 | Schwitte et al. |
| 2003/0084636 A1 | 5/2003 | Pervan |
| 2003/0094230 A1 | 5/2003 | Sjoberg |
| 2003/0101681 A1 | 6/2003 | Tychsen |
| 2003/0154676 A1 | 8/2003 | Schwartz |
| 2003/0180091 A1 | 9/2003 | Stridsman |
| 2003/0188504 A1 | 10/2003 | Ralf |
| 2003/0196405 A1 | 10/2003 | Pervan |
| 2004/0031227 A1 | 2/2004 | Knauseder |
| 2004/0049999 A1 | 3/2004 | Krieger |
| 2004/0060255 A1 | 4/2004 | Knauseder |
| 2004/0068954 A1 | 4/2004 | Martensson |
| 2004/0107659 A1 | 6/2004 | Glockl |
| 2004/0123548 A1 | 7/2004 | Gimpel et al. |
| 2004/0128934 A1 | 7/2004 | Hecht |
| 2004/0139676 A1 | 7/2004 | Knauseder |
| 2004/0139678 A1 | 7/2004 | Pervan |
| 2004/0168392 A1 | 9/2004 | Konzelmann et al. |
| 2004/0177584 A1 | 9/2004 | Pervan |
| 2004/0182033 A1 | 9/2004 | Wernersson |
| 2004/0182036 A1 | 9/2004 | Sjoberg et al. |
| 2004/0200175 A1 | 10/2004 | Weber |
| 2004/0211143 A1 | 10/2004 | Hanning |
| 2004/0250492 A1 | 12/2004 | Becker |
| 2004/0255541 A1 | 12/2004 | Thiers |
| 2004/0261348 A1 | 12/2004 | Vulin |
| 2005/0028474 A1 | 2/2005 | Kim |
| 2005/0050827 A1 | 3/2005 | Schitter |
| 2005/0138881 A1 | 6/2005 | Pervan |
| 2005/0160694 A1 | 7/2005 | Pervan |
| 2005/0166514 A1 | 8/2005 | Pervan |
| 2005/0210810 A1 | 9/2005 | Pervan |
| 2005/0235593 A1 | 10/2005 | Hecht |
| 2006/0070333 A1 | 4/2006 | Pervan |
| 2006/0099386 A1 | 5/2006 | Smith |
| 2006/0101769 A1 * | 5/2006 | Pervan et al. ............. 52/591.1 |
| 2006/0156670 A1 | 7/2006 | Knauseder |
| 2006/0236642 A1 | 10/2006 | Pervan |
| 2006/0260254 A1 | 11/2006 | Pervan |
| 2007/0006543 A1 | 1/2007 | Engstrom |
| 2007/0028547 A1 | 2/2007 | Grafenauer |
| 2007/0065293 A1 | 3/2007 | Hannig |
| 2007/0108679 A1 | 5/2007 | Grothaus |
| 2007/0151189 A1 | 7/2007 | Yang et al. |
| 2007/0175143 A1 | 8/2007 | Pervan et al. |
| 2007/0175156 A1 | 8/2007 | Pervan et al. |
| 2007/0193178 A1 | 8/2007 | Groeke et al. |
| 2007/0209736 A1 | 9/2007 | Deringor et al. |
| 2008/0000185 A1 | 1/2008 | Duernberger |
| 2008/0005989 A1 | 1/2008 | Pervan et al. |
| 2008/0010931 A1 | 1/2008 | Pervan et al. |
| 2008/0010937 A1 | 1/2008 | Pervan et al. |
| 2008/0028707 A1 | 2/2008 | Pervan |
| 2008/0034708 A1 | 2/2008 | Pervan |
| 2008/0041008 A1 | 2/2008 | Pervan |
| 2008/0066415 A1 | 3/2008 | Pervan |
| 2008/0104921 A1 | 5/2008 | Pervan et al. |
| 2008/0110125 A1 | 5/2008 | Pervan |
| 2008/0134607 A1 | 6/2008 | Pervan et al. |
| 2008/0134613 A1 | 6/2008 | Pervan |
| 2008/0155930 A1 | 7/2008 | Pervan et al. |
| 2008/0172971 A1 | 7/2008 | Pervan |
| 2008/0216434 A1 | 9/2008 | Pervan |
| 2008/0216920 A1 | 9/2008 | Pervan |
| 2008/0236088 A1 * | 10/2008 | Hannig ................... 52/592.1 |
| 2008/0263975 A1 | 10/2008 | Mead |
| 2008/0295432 A1 | 12/2008 | Pervan et al. |
| 2009/0019806 A1 | 1/2009 | Muehlebach |
| 2009/0100782 A1 | 4/2009 | Groeke et al. |
| 2009/0133353 A1 | 5/2009 | Pervan et al. |
| 2009/0151290 A1 | 6/2009 | Liu |
| 2009/0155612 A1 | 6/2009 | Pervan et al. |
| 2009/0193741 A1 | 8/2009 | Capelle |
| 2009/0193748 A1 | 8/2009 | Boo et al. |
| 2009/0193753 A1 | 8/2009 | Schitter |
| 2009/0308014 A1 | 12/2009 | Muehlebach |
| 2010/0043333 A1 | 2/2010 | Hannig et al. |
| 2010/0083603 A1 * | 4/2010 | Goodwin ................. 52/589.1 |
| 2010/0173122 A1 * | 7/2010 | Susnjara ................. 428/119 |
| 2010/0293879 A1 | 11/2010 | Pervan et al. |
| 2010/0300030 A1 | 12/2010 | Pervan et al. |
| 2010/0300031 A1 | 12/2010 | Pervan et al. |
| 2010/0319291 A1 | 12/2010 | Pervan et al. |
| 2011/0016815 A1 | 1/2011 | Yang |
| 2011/0030303 A1 | 2/2011 | Pervan et al. |
| 2011/0041996 A1 | 2/2011 | Pervan |
| 2011/0088344 A1 | 4/2011 | Pervan et al. |
| 2011/0088345 A1 | 4/2011 | Pervan |
| 2011/0131916 A1 | 6/2011 | Chen |
| 2011/0154763 A1 | 6/2011 | Bergelin et al. |
| 2011/0167750 A1 | 7/2011 | Pervan |
| 2011/0167751 A1 | 7/2011 | Engstrom |
| 2011/0197535 A1 | 8/2011 | Baker et al. |
| 2011/0225921 A1 * | 9/2011 | Schulte .................. 52/588.1 |
| 2011/0225922 A1 * | 9/2011 | Pervan et al. ............. 52/588.1 |
| 2011/0252733 A1 | 10/2011 | Pervan |
| 2011/0271632 A1 | 11/2011 | Cappelle et al. |
| 2011/0283650 A1 * | 11/2011 | Pervan et al. ............. 52/588.1 |
| 2012/0017533 A1 | 1/2012 | Pervan et al. |
| 2012/0031029 A1 | 2/2012 | Pervan et al. |
| 2012/0036804 A1 | 2/2012 | Pervan |
| 2012/0073235 A1 * | 3/2012 | Hannig .................. 52/588.1 |
| 2012/0124932 A1 | 5/2012 | Schulte et al. |
| 2012/0151865 A1 | 6/2012 | Pervan et al. |
| 2012/0174515 A1 | 7/2012 | Pervan |
| 2012/0174520 A1 | 7/2012 | Pervan |
| 2012/0174521 A1 | 7/2012 | Schulte et al. |
| 2012/0192521 A1 | 8/2012 | Schulte |

(56) References Cited

U.S. PATENT DOCUMENTS

| | | |
|---|---|---|
| 2013/0008117 A1 | 1/2013 | Pervan |
| 2013/0014463 A1 | 1/2013 | Pervan |
| 2013/0019555 A1 | 1/2013 | Pervan |
| 2013/0042562 A1 | 2/2013 | Pervan et al. |
| 2013/0042563 A1 | 2/2013 | Pervan |
| 2013/0042564 A1 | 2/2013 | Pervan |
| 2013/0042565 A1 | 2/2013 | Pervan |
| 2013/0047536 A1 | 2/2013 | Pervan |
| 2013/0055950 A1 | 3/2013 | Pervan et al. |
| 2013/0081349 A1 | 4/2013 | Pervan et al. |
| 2013/0111845 A1 | 5/2013 | Pervan |
| 2013/0145708 A1 | 6/2013 | Pervan |

FOREIGN PATENT DOCUMENTS

| | | |
|---|---|---|
| DE | 39 32 980 A1 | 11/1991 |
| DE | 299 22 649 U1 | 4/2000 |
| DE | 199 40 837 A1 | 11/2000 |
| DE | 199 58 225 A1 | 6/2001 |
| DE | 202 06 460 U1 | 7/2002 |
| DE | 202 05 774 U1 | 8/2002 |
| DE | 203 20 799 U1 | 4/2005 |
| DE | 10 2004 055 951 A1 | 7/2005 |
| DE | 10 2004 001 363 A1 | 8/2005 |
| DE | 10 2004 054 368 A1 | 5/2006 |
| DE | 10 2005 024 366 A1 | 11/2006 |
| DE | 10 2006 024 184 A1 | 11/2007 |
| DE | 10 2006 037 614 B3 | 12/2007 |
| DE | 10 2006 057 491 A | 6/2008 |
| DE | 10 2007 018 309 A1 | 8/2008 |
| DE | 10 2007 032 885 A1 | 1/2009 |
| DE | 10 2007 035 648 A1 | 1/2009 |
| DE | 10 2007 049 792 A1 | 2/2009 |
| DE | 10 2009 048 050 B3 | 1/2011 |
| EP | 0 013 852 A1 | 8/1980 |
| EP | 0 871 156 A2 | 10/1998 |
| EP | 0 974 713 A1 | 1/2000 |
| EP | 1 308 577 A2 | 5/2003 |
| EP | 1 350 904 A2 | 10/2003 |
| EP | 1 350 904 A3 | 10/2003 |
| EP | 1 357 239 A2 | 10/2003 |
| EP | 1 357 239 A3 | 10/2003 |
| EP | 1 420 125 A2 | 5/2004 |
| EP | 1 437 457 A2 | 7/2004 |
| EP | 1 640 530 A2 | 3/2006 |
| EP | 1 650 375 A1 | 4/2006 |
| EP | 1 650 375 A8 | 9/2006 |
| EP | 1 980 683 A2 | 10/2008 |
| EP | 2 017 403 A2 | 1/2009 |
| FR | 1.138.595 | 6/1957 |
| FR | 2 256 807 | 8/1975 |
| FR | 2 810 060 A1 | 12/2001 |
| GB | 240629 | 10/1925 |
| GB | 376352 | 7/1932 |
| GB | 1171337 | 11/1969 |
| GB | 2 051 916 A | 1/1981 |
| JP | 03-110258 A | 5/1991 |
| JP | 05-018028 A | 1/1993 |
| JP | 6-288017 A | 10/1994 |
| JP | 6-306961 A | 11/1994 |
| JP | 6-322848 A | 11/1994 |
| JP | 7-300979 A | 11/1995 |
| JP | 8-086080 A | 4/1996 |
| WO | WO 94/26999 A1 | 11/1994 |
| WO | WO 97/47834 A1 | 12/1997 |
| WO | WO 98/22677 A1 | 5/1998 |
| WO | WO 00/20705 A1 | 4/2000 |
| WO | WO 00/43281 A1 | 7/2000 |
| WO | WO 00/47841 A1 | 8/2000 |
| WO | WO 00/55067 A1 | 9/2000 |
| WO | WO 01/02669 A1 | 1/2001 |
| WO | WO 01/02670 A1 | 1/2001 |
| WO | WO 01/02672 A1 | 1/2001 |
| WO | WO 01/48332 A1 | 7/2001 |
| WO | WO 01/51732 A1 | 7/2001 |
| WO | WO 01/66877 A1 | 9/2001 |
| WO | WO 01/75247 A1 | 10/2001 |
| WO | WO 01/77461 A1 | 10/2001 |
| WO | WO 01/98604 A1 | 12/2001 |
| WO | WO 02/48127 | 6/2002 |
| WO | WO 03/012224 A1 | 2/2003 |
| WO | WO 03/016654 A1 | 2/2003 |
| WO | WO 03/025307 A1 | 3/2003 |
| WO | WO 03/074814 A1 | 9/2003 |
| WO | WO 03/078761 A1 | 9/2003 |
| WO | WO 03/083234 A1 | 10/2003 |
| WO | WO 03/087497 A1 | 10/2003 |
| WO | WO 03/089736 A1 | 10/2003 |
| WO | WO 2004/016877 A1 | 2/2004 |
| WO | WO 2004/020764 A1 | 3/2004 |
| WO | WO 2004/053257 A1 | 6/2004 |
| WO | WO 2004/053257 A8 | 6/2004 |
| WO | WO 2004/079130 A1 | 9/2004 |
| WO | WO 2004/083557 A1 | 9/2004 |
| WO | WO 2004/085765 A1 | 10/2004 |
| WO | WO 2005/003488 A1 | 1/2005 |
| WO | WO 2005/054599 A1 | 6/2005 |
| WO | WO 2006/043893 A1 | 4/2006 |
| WO | WO 2006/050928 A1 | 5/2006 |
| WO | WO 2006/104436 A1 | 10/2006 |
| WO | WO 2006/123988 A1 | 11/2006 |
| WO | WO 2007/015669 A2 | 2/2007 |
| WO | WO 2007/079845 A1 | 7/2007 |
| WO | WO 2007/089186 A1 | 8/2007 |
| WO | WO 2007/141605 A2 | 12/2007 |
| WO | WO 2007/142589 A1 | 12/2007 |
| WO | WO 2008/004960 A2 | 1/2008 |
| WO | WO 2008/004960 A8 | 1/2008 |
| WO | WO 2008/017281 A1 | 2/2008 |
| WO | WO 2008/017301 A2 | 2/2008 |
| WO | WO 2008/017301 A3 | 2/2008 |
| WO | WO 2008/060232 A1 | 5/2008 |
| WO | WO 2008/068245 A1 | 6/2008 |
| WO | WO 2009/116926 A1 | 9/2009 |
| WO | WO 2010/070472 A2 | 6/2010 |
| WO | WO 2010/070605 A2 | 6/2010 |
| WO | WO 2010/087752 A1 | 8/2010 |
| WO | WO 2010/108980 A1 | 9/2010 |
| WO | WO 2010/136171 A1 | 12/2010 |
| WO | WO 2011/001326 A2 | 1/2011 |
| WO | WO 2011/012104 A2 | 2/2011 |
| WO | WO 2011/032540 A2 | 3/2011 |
| WO | WO 2011/127981 A1 | 10/2011 |
| WO | WO 2011/151758 A2 | 12/2011 |

OTHER PUBLICATIONS

U.S. Appl. No. 13/540,107, Pervan.
U.S. Appl. No. 13/544,281, Pervan.
U.S. Appl. No. 13/546,569, Pervan.
U.S. Appl. No. 13/585,204, Pervan.
U.S. Appl. No. 13/585,485, Pervan.
U.S. Appl. No. 13/585,179, Pervan.
U.S. Appl. No. 13/596,988, Pervan.
U.S. Appl. No. 13/660,538, Pervan, et al.
U.S. Appl. No. 13/670,039, Pervan, et al.
U.S. Appl. No. 13/728,121, Pervan, et al.
U.S. Appl. No. 61/620,233, Boo.
U.S. Appl. No. 61/620,246, Boo.
Pervan, Darko, et al., U.S. Appl. No. 13/758,603, entitled "Mechanical Locking System for Panels and Method of Installing Same," filed in the U.S. Patent and Trademark Office Feb. 4, 2013.
U.S. Appl. No. 13/758,603, Pervan, et al.
U.S. Appl. No. 13/855,966, Boo.
U.S. Appl. No. 13/855,979, Boo et al.
Pervan, Darko, et al., U.S. Appl. No. 13/886,916, entitled "Mechanical Locking of Building Panels," filed in the U.S. Patent and Trademark Office May 3, 2013.
Boo, Christian, U.S. Appl. No. 13/855,966, entitled "Building Panel with a Mechanical Locking System," filed in the U.S. Patent and Trademark Office Apr. 3, 2013.

(56) References Cited

OTHER PUBLICATIONS

Boo, Christian, et al., U.S. Appl. No. 13/855,979, entitled "Method for Producing a Mechanical Locking System for Building Panels," filed in the U.S. Patent and Trademark Office Apr. 3, 2013.
International Search Report mailed Aug. 2, 2012 in PCT/SE2012/050475, Swedish Patent Office, Stockholm, Sweden, 8 pages.
Pervan, Darko, et al., U.S. Appl. No. 13/577,042, entitled "Mechanical Locking System for Floor Panels," filed in the U.S. Patent and Trademark Office Aug. 3, 2012.
Pervan, Darko, U.S. Appl. No. 13/540,107, entitled "Mechanical Locking of Floor Panels with a Glued Tongue," filed in the U.S. Patent and Trademark Office Jul. 2, 2012.
Pervan, Darko, U.S. Appl. No. 13/544,281, entitled "Mechanical Locking System for Floor Panels," filed in the U.S. Patent and Trademark Office Jul. 9, 2012.
Pervan, Darko, et al., U.S. Appl. No. 13/546,569, entitled "Mechanical Locking System for Floor Panels," filed in the U.S. Patent and Trademark Office Jul. 11, 2012.
Pervan, Darko, et al., U.S. Appl. No. 13/585,204, entitled "Mechanical Locking System for Floor Panels," filed in the U.S. Patent and Trademark Office Aug. 14, 2012.
Pervan, Darko, et al., U.S. Appl. No. 13/585,485, entitled "Mechanical Locking System for Floor Panels," filed in the U.S. Patent and Trademark Office Aug. 14, 2012.
Pervan, Darko, et al., U.S. Appl. No. 13/585,179, entitled, "Mechanical Locking System for Floor Panels," filed in the U.S. Patent and Trademark Office Aug. 14, 2012.
Pervan, Darko, et al., U.S. Appl. No. 13/596,988, entitled, "Mechanical Locking System for Floor Panels," filed in the U.S. Patent and Trademark Office Aug. 28, 2012.
Pervan, Darko, et al., U.S. Appl. No. 13/660,538, entitled "Mechanical Locking of Floor Panels with Vertical Snap Folding," filed in the U.S. Patent and Trademark Office Oct. 25, 2012.
Pervan, Darko, et al., U.S. Appl. No. 13/670,039, entitled "Mechanical Locking of Floor Panels with a Flexible Tongue," filed in the U.S. Patent and Trademark Office Nov. 6, 2012.
Pervan, Darko, et al., U.S. Appl. No. 13/728,121, entitled "Mechanical Locking of Floor Panels with a Flexible Tongue," filed in the U.S. Patent and Trademark Office Dec. 27, 2012.
Boo, Christian, U.S. Appl. No. 61/620,233, entitled "Building Panel with a Mechanical Locking System," filed in the U.S. Patent and Trademark Office Apr. 4, 2012.
Boo, Christian, U.S. Appl. No. 61/620,246, entitled "Method for Producing a Mechanical Locking System for Building Panels," filed in the U.S. Patent and Trademark Office Apr. 4, 2012.
Välinge Innovation AB, Technical Disclosure entitled "Mechanical locking for floor panels with a flexible bristle tongue," IP.com No. IPCOM000145262D, Jan. 12, 2007, IP.com PriorArtDatabase, 57 pages.

Engstrand, Ola (Contact)/Välinge Innovation AB, Technical Disclosure entitled "VA-038 Mechanical Locking of Floor Panels With Vertical Folding," IP com No. IPCOM000179246D, Feb. 10, 2009, IP.com Prior Art Database, 59 pages.
Engstrand, Ola (Contact)/Välinge Innovation AB, Technical Disclosure entitled "VA043 5G Linear Slide Tongue," IP com No. IPCOM000179015D, Feb. 4, 2009, IP.com Prior Art Database, 126 pages.
Engstrand, Ola (Owner)/Välinge Innovation AB, Technical Disclosure entitled "VA043b PCT Mechanical Locking of Floor Panels," IP com No. IPCOM000189420D, Nov. 9, 2009, IP.com Prior Art Database, 62 pages.
Engstrand, Ola (Contact)/Välinge Innovation AB, Technical Disclosure entitled "VA055 Mechanical locking system for floor panels," IP com No. IPCOM000206454D, Apr. 27, 2011, IP.com Prior Art Database, 25 pages.
Engstrand, Ola (Contact)/Välinge Innovation AB, Technical Disclosure entitled "VA058 Rocker Tongue," IP com No. IPCOM000203832D, Feb. 4, 2011, IP.com Prior Art Database, 22 pages.
Pervan, Darko (Author)/Välinge Flooring Technology, Technical Disclosure entitled "VA066b Glued Tongue," IP com No. IPCOM000210865D, Sep. 13, 2011, IP.com Prior Art Database, 19 pages.
Pervan, Darko (Inventor)/Välinge Flooring Technology AB, Technical Disclosure entitled "VA067 Fold Slide Loc," IP com No. IPCOM000208542D, Jul. 12, 2011, IP.com Prior Art Database, 37 pages.
Pervan, Darko (Author)/Välinge Flooring Technology, Technical Disclosure entitled "VA068 Press Lock VFT," IP com No. IPCOM000208854D, Jul. 20, 2011, IP.com Prior Art Database, 25 pages.
Pervan, Darko (Author), Technical Disclosure entitled "VA069 Combi Tongue," IP com No. IPCOM000210866D, Sep. 13, 2011, IP.com Prior Art Database, 41 pages.
Pervan, Darko (Author), Technical Disclosure entitled "VA070 Strip Part," IP com No. IPCOM000210867D, Sep. 13, 2011, IP.com Prior Art Database, 43 pages.
Pervan, Darko (Author), Technical Disclosure entitled "VA071 Pull Lock," IP com No. IPCOM000210868D, Sep. 13, 2011, IP.com Prior Art Database, 22 pages.
Pervan, Darko (Author), Technical Disclosure entitled "VA073a Zip Loc," IP com No. IPCOM000210869D, Sep. 13, 2011, IP.com Prior Art Database, 36 pages.
Derelöv, et al., U.S. Appl. No. 14/158,165, entitled "Assembled Product and a Method of Assembling the Product," filed in the U.S. Patent and Trademark Office on Jan. 17, 2014.
Bränström, Hans, et al., U.S. Appl. No. 14/486,681, entitled "An Assembled Product and a Method of Assembling the Assembled Product," filed in the U.S. Patent and Trademark Office on Sep. 15, 2014.

\* cited by examiner

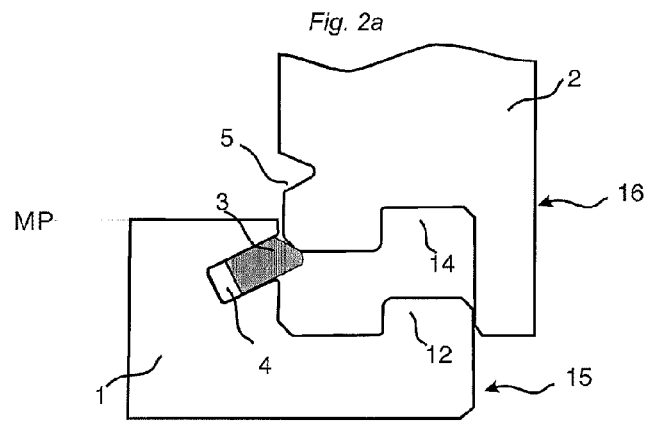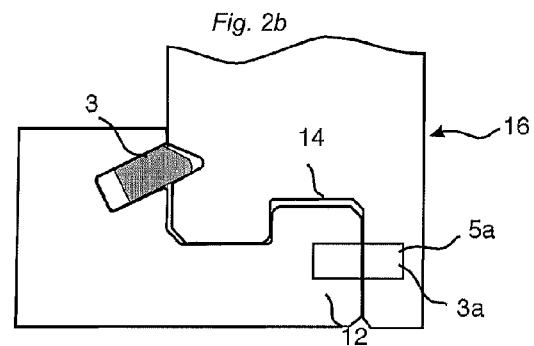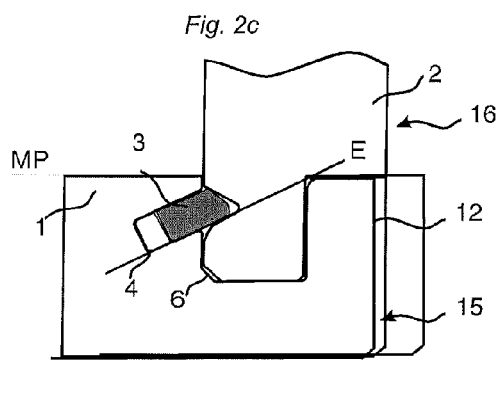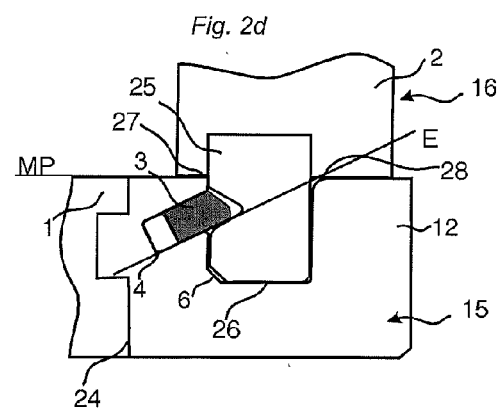

MECHANICAL LOCKING SYSTEM FOR BUILDING PANELS

CROSS REFERENCE TO RELATED APPLICATIONS

The present application claims the benefit of U.S. Provisional Application No. 61/483,444, filed on May 6, 2011 and claims the benefit of Swedish Application No. 1150400-8, filed on May 6, 2011. The entire contents of each of U.S. Provisional Application No. 61/483,444 and Swedish Application No. 1150400-8 are hereby incorporated herein by reference.

TECHNICAL FIELD

The disclosure relates to the field of mechanical locking systems for building panels, especially furniture components with mechanical locking systems, which are intended to lock preferably perpendicular to each other.

FIELD OF APPLICATION OF THE INVENTION

Embodiments of the present invention are particularly suitable for use in furniture components, which are preferably formed of sheet shaped panels and which are joined mechanically with a locking system integrated with the panel, i.e. mounted at the factory. The following description of known technology, problems of known systems and objects and features of the invention will therefore, as a non-restrictive example, be aimed above all at this field of application and in particular at furniture components formed as rectangular panels intended to be mechanically joined on one pair of opposite edges perpendicularly to other adjacent panels. The panels may also be square.

It should be emphasized that the invention can be applied to any type of sheet shaped panel such as for example wood based HDF, particle board and plywood, plastic sheet shaped materials, mineral fibre and metal based materials, stone and ceramics and similar. It may be used to connect furniture components, and elements for packaging boxes and similar. It may also be used to lock components, which for example have a cylinder form such as table legs.

BACKGROUND OF THE INVENTION

Furniture such as kitchen cabinets, bookshelves, drawers, tables and similar are generally supplied as flat components in order to save transportation costs. The customer must assemble them. Several methods are used to assemble such furniture components, for example, glue, spikes, screws and similar. Snapping connections comprising plastic components are widely used to connect, for example, drawers.

KNOWN TECHNOLOGY AND PROBLEMS THEREOF

There are a lot of problems connected with the assembly of furniture components especially when one panel should be connected perpendicularly to another panel. Generally special connection devices are supplied that have to be inserted into grooves and holes. Such assembly is complicated and time consuming and the connection is often not strong enough. Snapping connections formed in plastic materials are expensive and complicated to produce. It would be an advantage if assembly may be simplified and if no loose parts would be needed in order to connect panels to each other in a firm, cost efficient and rigid manner.

WO 2010/070472 describes locking systems that may be used to assemble furniture components with angling and snapping. The locking systems may be formed in one piece with the panel or, alternatively, a separate plastic tongue with an outer flexible snap tab may be used. Such locking systems do not give sufficient strength and rigidity especially when rather soft core materials, such as particleboard, are used. The locking system is complicated to produce since the flexible tongue cannot be connected to the components with a linear displacement into a groove. The outer flexible part is generally not strong enough to provide a rigid connection

SUMMARY OF THE INVENTION

A basic objective of embodiments of the present invention is to provide an improved mechanical locking system which may be produced in a cost effective way and which allows preferably rectangular panels to be connected and assembled mechanically perpendicularly to each other with a strong locking and in a simple manner without the need for loose parts that has to be used during assembly.

The above objects of embodiments of the invention are achieved wholly or partly by mechanical locking systems and panels, according to the independent claim that provide a stronger and easier locking. Embodiments of the invention are evident from the dependent claims and from the description and drawings.

A first aspect of the invention is a set of panels comprising a first and a second panel. An edge of the second panel is insertable into a groove of the first panel, when the panels are arranged essential perpendicular to each other, to obtain a mechanical connection between the first and the second panel, when the second panel is displaced essentially perpendicularly to the first panel. The edge comprises a separate and flexible tongue and said groove comprises a tongue groove, or said edge comprises a tongue groove and said groove comprises a separate and flexible tongue. The separate and flexible tongue is insertable into the tongue groove for connecting said panels to each other in a first direction, which is parallel to a main plane of the first panel. The edge of the second panel is configured to cooperate with the groove of the first panel for connecting said panels to each other in a second direction, which is parallel to a main plane (MP) of the second panel. The length direction of the separate and flexible tongue extends parallel with said edge and/or groove. The groove preferably comprises an opening, two sidewalls and a bottom. The separate and flexible tongue is arranged in an insertion groove. The separate and flexible tongue has an inner part mounted in the insertion groove and an outer part extending outside an opening of the insertion groove. A part of the separate tongue is displaced in the insertion groove during locking. The flexible tongue is preferably displaceable inwardly towards a bottom of the insertion groove and outwardly into the tongue groove during locking.

The tongue may comprise two opposite displacement surfaces located between the inner and outer parts of the separate and flexible tongue. One or both of said two opposite displacement surfaces may be displaceable against a wall(s) of the insertion groove during locking.

A locking involving displacement of a displacement surface against an upper or lower wall of the insertion groove may make it possible use a tongue with a rigid outer part. That may facilitate a strong locking even in rather soft materials such a particle boards that are often used a base material in furniture components. The outer rigid part may be displaced into a rather deep tongue groove and a firm locking may be obtained.

Said insertion groove may be inclined upwards with the opening closer to the main plane of the panel than the inner part of the insertion groove. Such inclination may facilitate the insertion of the separate tongue into the insertion groove during production since the tongue may be inserted with a linear motion into the displacement groove.

The separate and flexible tongue may, when the edge of the second panel is inserted into the groove of the first panel, lock by snapping.

The inner part may be fixed in the insertion groove by e.g. friction connection or by glue.

The inner part of the tongue may comprise one or several flexible protrusions extending in the length direction of the tongue.

The first and/or the second panel may comprise separate materials that form an edge or a groove portion. A particleboard panel may be reinforced with solid wood, plywood, HDF and similar wood based materials that are glued or mechanically connected to the panels in order to form at least a part of the locking system The second panel may have an outer edge with a smaller thickness than the thickness of the panel body such that the panel body overlaps one or both parts of the groove opening when the second panel is inserted into the groove of the first panel At least a part of the tongue and/or the groove may be formed in the first and the second panel respectively before a part of the tongue and/or the groove, and preferably a part of the panel, may be covered by a layer, such as a foil.

The above-described locking system allows that panels may be locked automatically perpendicularly to each other with a snap action and without any loose parts. The flexible tongue provides a strong and easy locking in middle sections and in corner sections.

The tongue is preferably factory connected but it may of course be delivered separately in blanks or as a separate loose component and inserted into a groove during installation.

The panels may not be only connectable perpendicular to each other but may also be connectable to each other at an angle of less than 180° between the main planes of the first and the second panel or preferably in the range of about 45° to about 135°.

BRIEF DESCRIPTION OF THE DRAWINGS

FIGS. 2a-b illustrate a corner section according to an embodiment of the invention.

FIGS. 2c-2d illustrate corner section or middle sections according to embodiments of the invention.

DESCRIPTION OF EMBODIMENTS OF THE INVENTION

To facilitate understanding, several locking systems in the figures are shown schematically. It should be emphasized that improved or different functions can be achieved using combinations of the preferred embodiments.

Figure 1A:
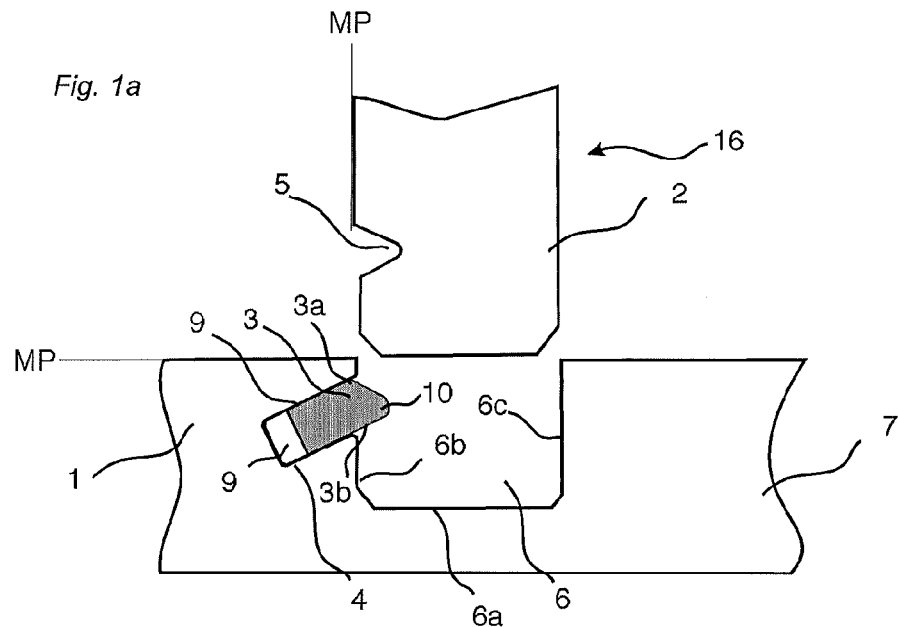
FIGS. 1a-c illustrate a perpendicular snap action of a middle section according to an embodiment of the invention.
Figure 1B:
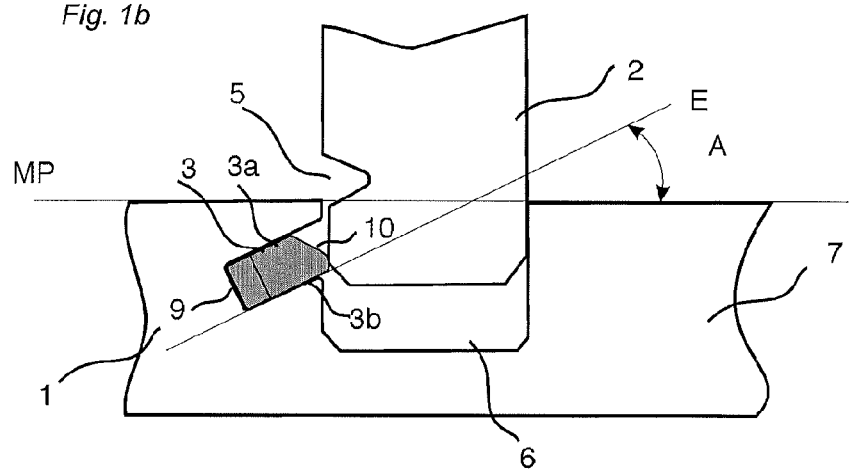
Figure 1C:
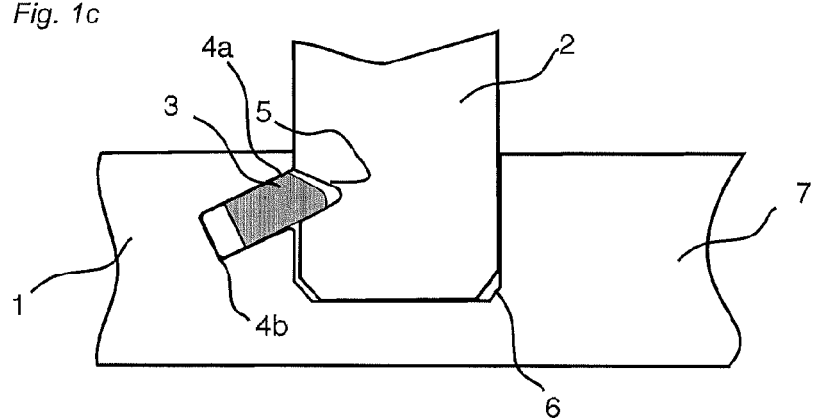

FIGS. 1a-1c show a connection with a perpendicular snap action according to a preferred embodiment of the invention. FIG. 1a shows a first 1 and a second 2 panel. The first panel 1 comprises a groove 6, formed in the panel core 7. The groove comprises a bottom 6a and two opposite groove walls 6b, 6c. The groove is open towards a main plane MP of the first panel 1. An insertion groove 4 is formed in one of the groove walls 6b. The insertion groove 4 is preferably inclined in relation to the main plane MP of the panel such that the opening of the insertion groove 4a is closer to the main plane MP than the inner part 4b. It is preferred that a linear extension E of the insertion groove extends at or more preferably above the opening of the groove 6. This makes it possible to form the insertion groove with large rotating tools and to insert a separate tongue 3 into the groove. The insertion groove is preferably inclined with an angle A of about 10-45 degrees. The insertion groove comprises a flexible tongue 3, which has an inner part 9 and an outer part 10 and preferably two opposite sliding surfaces 3a and 3b between the inner 9 and the outer 10 parts.

FIG. 1b shows how the flexible tongue 3 with its displacement surfaces 3a, 3b is displaced inwardly into the insertion groove 4 when the second panel 2 is inserted into the groove 6 perpendicularly to the first panel 1.

FIG. 1c shows how the flexible tongue 3 is displaced in the insertion groove outwardly into the tongue groove 5 such that the second panel is connected perpendicular and parallel to the first panel with preferably a snap action. The flexible tongue and the tongue groove lock the panels perpendicularly to the main plane MP of the first panel 1. The groove 6 and the edge 16 of the second panel lock the panels parallel to the main plane MP of the first panel 1. The flexible tongue 3 may be locked with pre tension into the tongue groove 5.

FIGS. 2a and 2b show another preferred embodiment of the invention where the edge 15, of the first panel comprises a locking element 12 and the edge 16 of the second panel comprises a locking groove 14. The locking element and the locking groove locks the panels parallel to the main plane of the first panel. This embodiment may be used to connect corner sections. A tongue 3a and a tongue groove 5a may also be located and formed on the outer part of the locking element 12 and/or in a groove wall of the locking groove 14 as shown in FIG. 2b. There may be a space between the outer part of the locking element 12 and the locking groove, or a play or a tight fit. The insertion groove 4 may be formed in the second panel and the tongue groove 5 in the first panel. The insertion groove and/or the locking surfaces between the flexible tongue and the tongue groove may be inclined or essentially parallel to the main plane MP of the first panel.

FIG. 2c shows an alternative embodiment, which may be used to connect corner sections or middle sections. The edge 15, of the first panel 1, comprises a locking element 12 that in locked position forms an outer free end of the panel. The flexible tongue 3 is displaced inwardly into the insertion groove 4 when the second panel 2 is inserted into the groove 6 perpendicularly to the first panel 1. The inclination of the insertion groove 4 facilitates the insertion of the flexible tongue 3 into the insertion groove 4 during production and locking may be accomplished with lower resistance since the flexible tongue 3 slides inwardly and downwardly during locking. The insertion groove is preferably inclined such that an extension E of its lower part is located at or above the upper part of the locking element 12.

FIG. 2d shows that the second panel 2 may have an outer edge 26 with a smaller thickness than the panel body 2 such that the panel body 2 overlaps one 27 or both parts 27, 28 of the groove opening when the second panel 2 is inserted into the groove 6 of the first panel 1. The first and/or the second panel may comprise separate materials 24, 25 that form an edge or a groove portion of the first or the second panels. A particle board panel may for example be reinforced with solid wood, plywood, HDF and similar wood based materials that are glued or mechanically connected to the panel in order to form at least a part of the locking system. Separate materials may be covered with for example a foil, paper or paint.

Figure 3A:
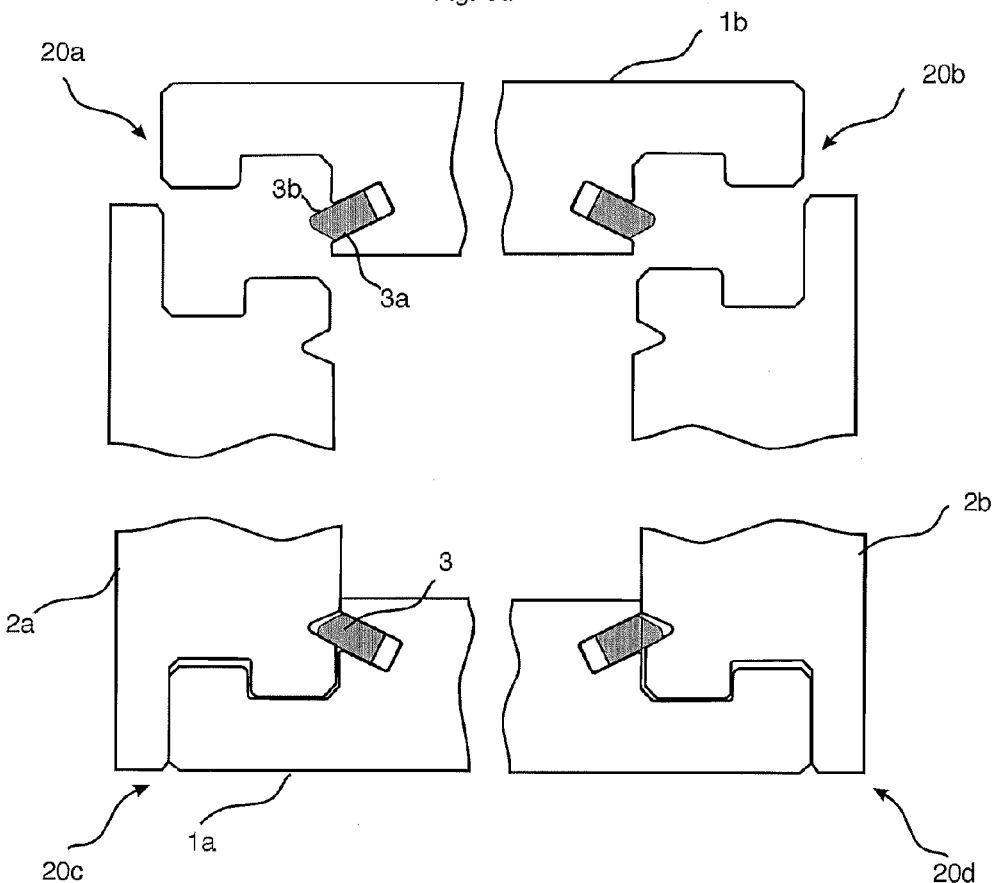
FIGS. 3a-b illustrate locking of four panels and a corner section according to embodiments of the invention.

FIG. 3 shows a connection of four corner sections 20a, b, c, d. Four panels of for example a kitchen cabinet may be connected. A first panel 1a is placed on a floor. A second 2a and a third 2b panel are connected with snapping to the first panel 1a. Finally a fourth panel 1b is connected to the second and third panels.

Figure 3B:
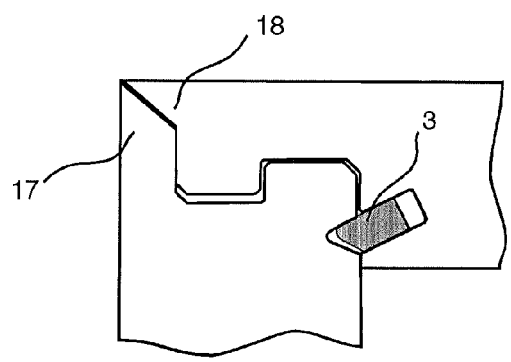

FIG. 3b shows a corner section where the adjacent panel edges 17, 18 are inclined, preferably inwardly and preferably with an angle of about 45 degrees against the main plane of the panels.

Figure 4A:
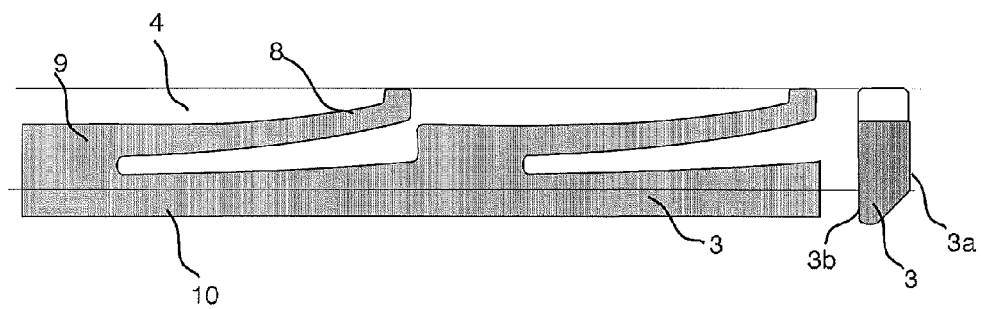
FIGS. 4a-d illustrate a bristle tongue and a bow shaped tongue according to embodiments of the invention.
Figure 4B:
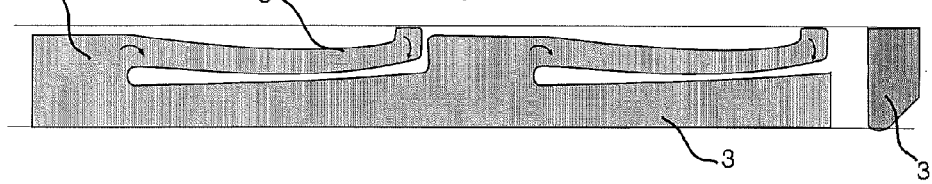
Figure 4C:
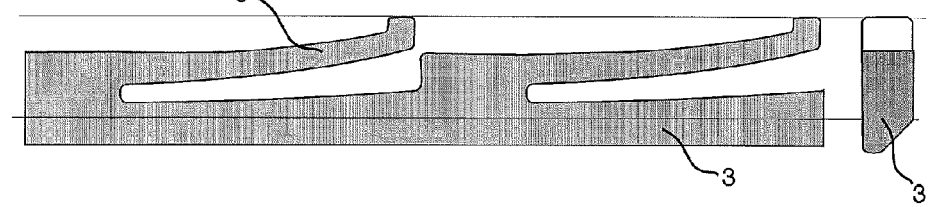

FIGS. 4a-4c show a known flexible bristle tongue 3, which is used to connect floor panels. Such a tongue may be used to connect panels according to embodiments of the invention. The tongue comprises flexible protrusions 7 that bend in the length direction of the tongue and that displace the tongue in the insertion groove during the snap action. FIG. 4a shows the tongue in the outer position prior to locking, FIG. 4b shows the tongue 3 in the inner position during locking, and FIG. 4c shows the tongue 3 in the outer and locked position.

Figure 4D:
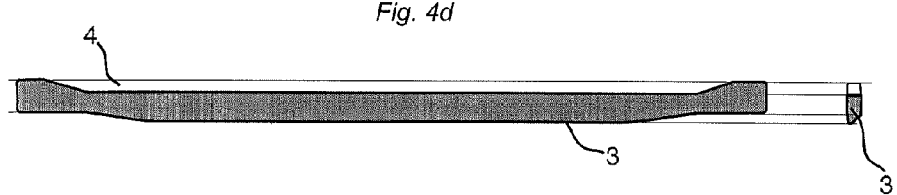

FIG. 4d shows a flexible bow shaped tongue 3 that bends in the length direction.

All known flexible tongues that are used to lock floor panels may be used in embodiments of this invention. Tongues that bend in the length direction are preferred, for example, bristle tongues and bow shaped tongues, as shown in FIGS. 4a and 4d, since such tongues have the advantage that flexibility may be combined with a rigid and strong outer part that creates a strong locking even in rather soft core materials such as particle boards that are generally used as a core in furniture components. It is an advantage if the tongue creates a pre tension against the tongue groove in locked position. This gives a stronger locking and eliminates production tolerances especially if the locking surface of the tongue/tongue groove is inclined against the main plane of the first panel. The tongue is preferably formed of an injection moulded plastic material preferably reinforced with glass fibres.

Figure 5A:
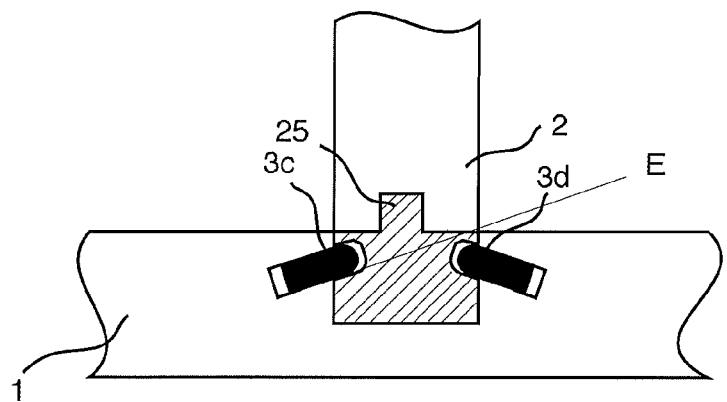
FIGS. 5a-5c illustrate embodiments of the invention.

FIG. 5a shows an embodiment with two tongues 3a, 3b. The edge of the second panel 2 may comprise a separate material 25.

Figure 5B:
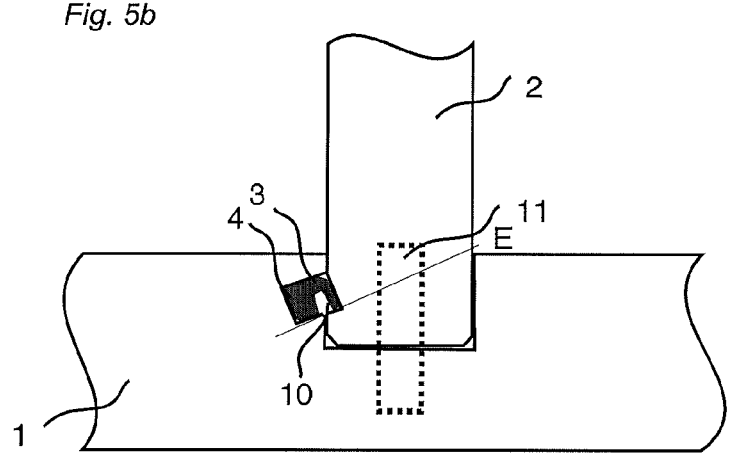

FIG. 5b shows a tongue 3 that comprise an outer part 4 with a snap tab that during snapping is displaced at least partly into an inclined insertion groove 4. The locking system comprises a stabilizing tongue 11 that may be formed in one piece with the core or inserted as a separate element.

Figure 5C:
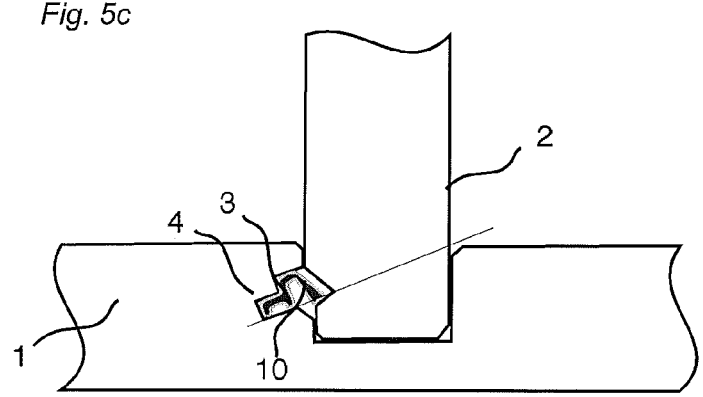

FIG. 5c shows a tongue 3 comprising a snap tab 10 that during snapping is displaced outside the insertion groove 4

Figure 6A:
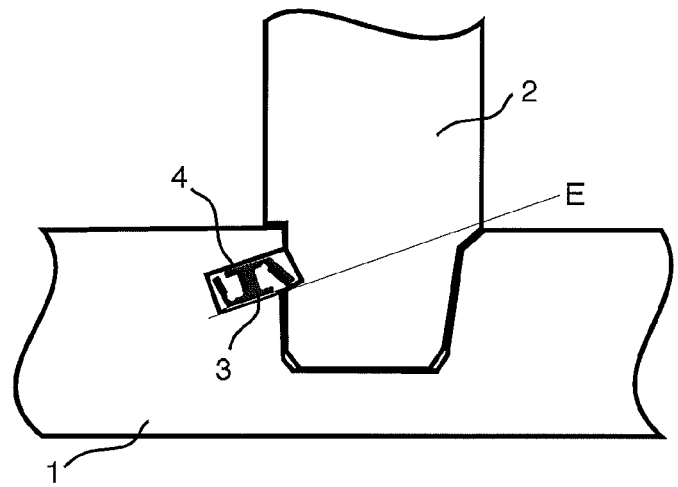
FIGS. 6a-6c illustrate embodiments of the invention.
Figure 6B:
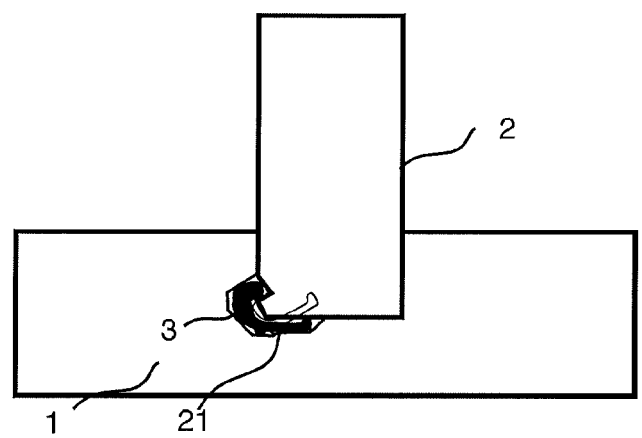

FIG. 6a shows a tongue that comprises an inner and outer flexible part. FIG. 6b shows an embodiment with a turning and snapping tongue 3 comprising a pressing arm 21 that turns and snaps the tongue 3 into a tongue groove.

Figure 6C:
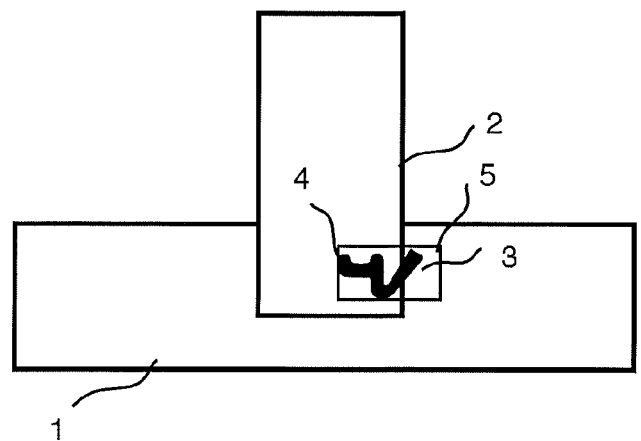

FIG. 6c shows schematically that the insertion groove 4 may be formed in the second panel 2.

Figure 7A:
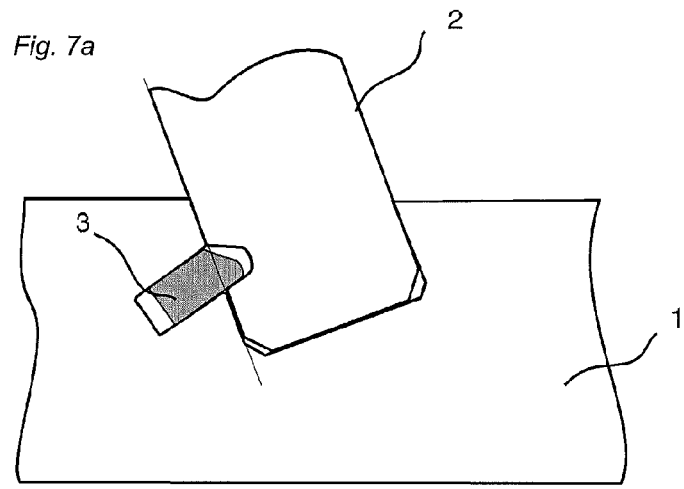
FIGS. 7a-7c illustrate embodiments of the invention.
Figure 7B:
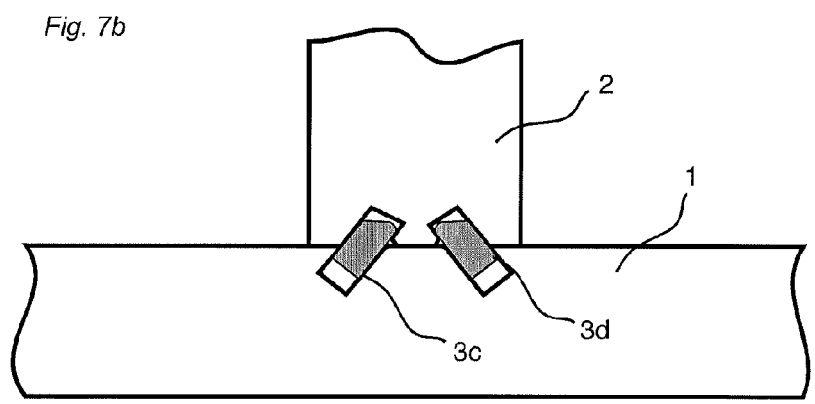
Figure 7C:
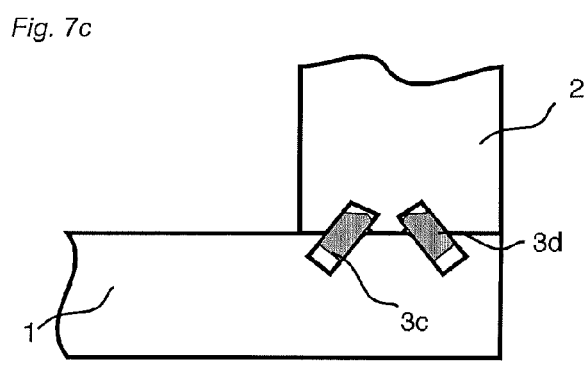

FIGS. 7a-7c show alternative positions of the flexible tongues. FIG. 7a shows that the second panel may be somewhat inclined for example 45-89 degrees against main plane of the first panel. FIG. 7b shows two tongues 3a,3b attached to a middle section of a first panel 1 and FIG. 7c shows a corner section.

Figure 8A:
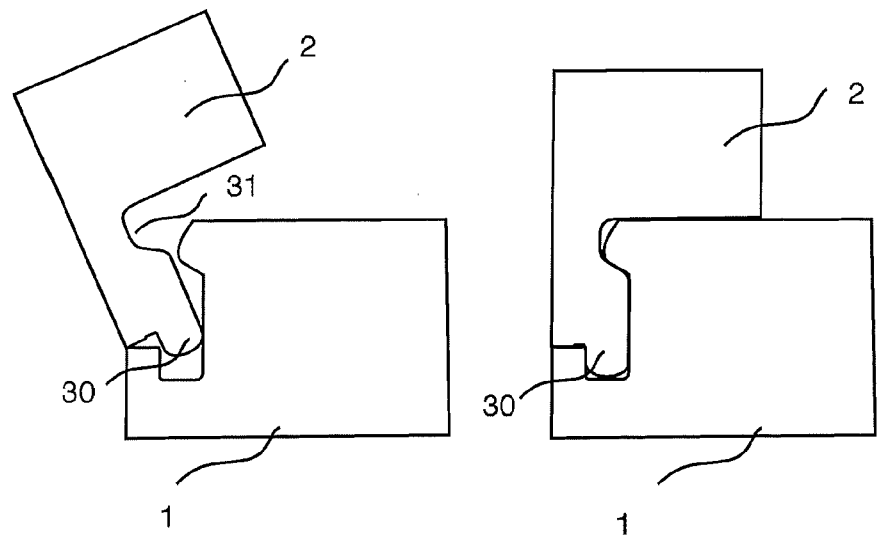
FIGS. 8a-b illustrate an angling connection according to embodiments of the invention.
Figure 8B:
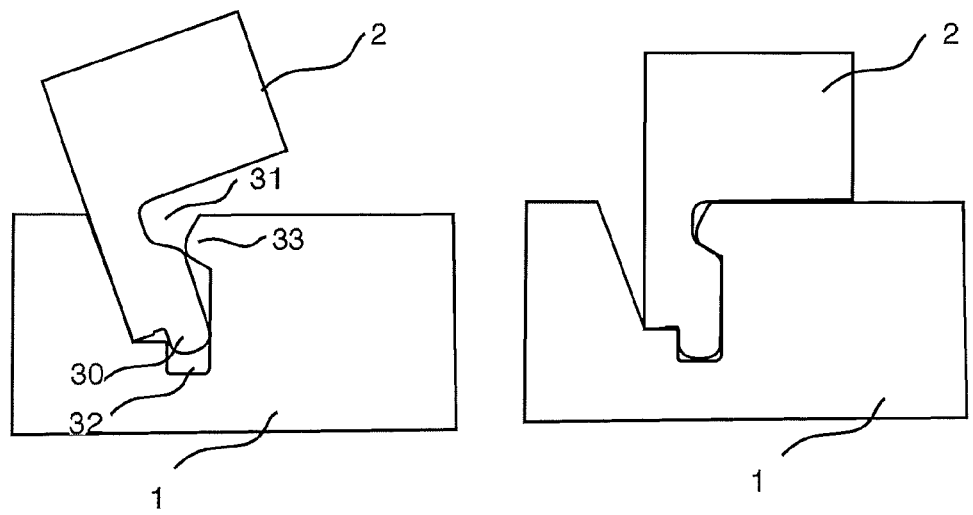

FIGS. 8a and 8b shows that two panels may be angled together according to the generally known principles used in locking systems for flooring. Such angling connection may be combined with all snapping embodiments described above. FIG. 8a shows an angling connection of a corner section and FIG. 8b shows an angling connection of a middle section. The second panel 2 that is angled during connection comprises a tongue 30 and a locking groove 31 that cooperates during locking with a tongue groove 32 and a locking element 33 formed in the first panel.

Figure 9A:
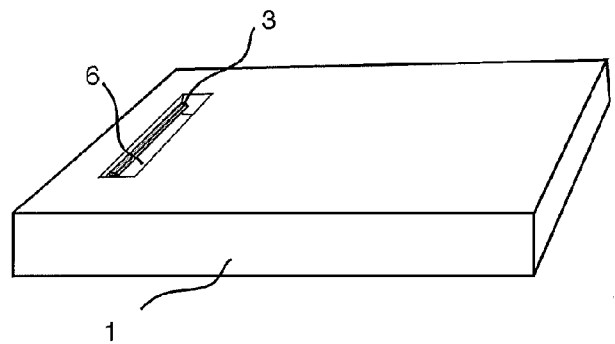
FIGS. 9a-d illustrate a partial groove and a side push tongue according to embodiments of the invention.

All fixation and tongue grooves may be formed over the complete length or with of a panel. They may also be formed as one or several local grooves, which only extend along a part of the panel. Such grooves may be formed in many ways for example with rotating jumping tool heads. Such a local groove 6 is schematically shown in FIG. 9a.

Figure 9B:
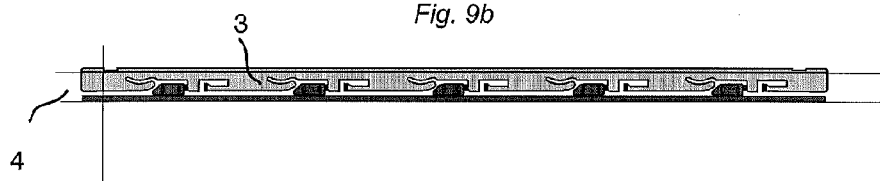
Figure 9C:
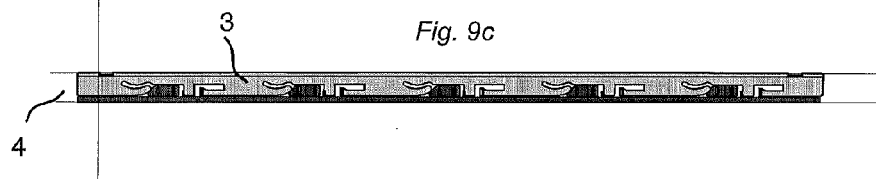
Figure 9D:
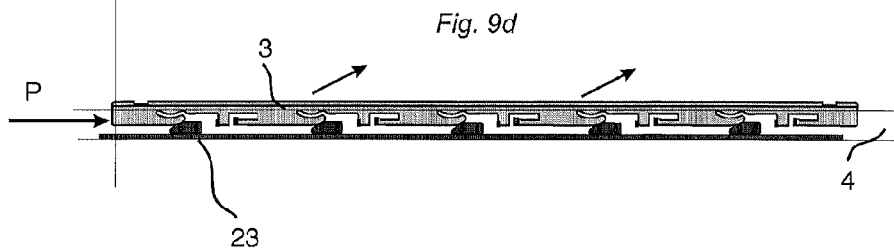

FIGS. 9b-9d show that the so-called side push locking systems may also be used to connect furniture components. Such a tongue 3 that is displaced width a side pressure P along the insertion groove 4 and perpendicularly to the insertion groove into the tongue groove may be used in all embodiments shown above. The perpendicular displacement may be accomplished with wedges 23 or with a fixation groove, which have a depth that varies along the groove. The tongue 3 and the tongue groove may also comprise overlapping protrusion and a locking may be accomplished with a displacement along the insertion groove without any perpendicular displacement into the tongue groove. Such embodiments allow locking with a rigid tongue and no flexible parts are needed.

Figure 10A:
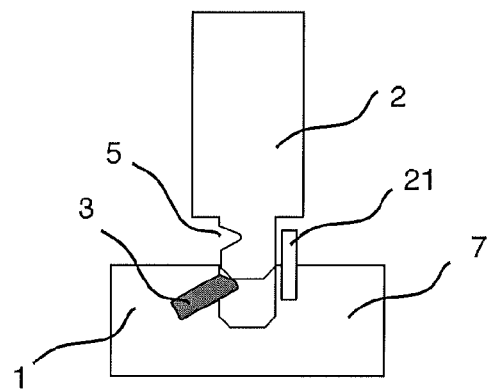
FIGS. 10a-10c illustrate embodiments of the invention.
Figure 10B:
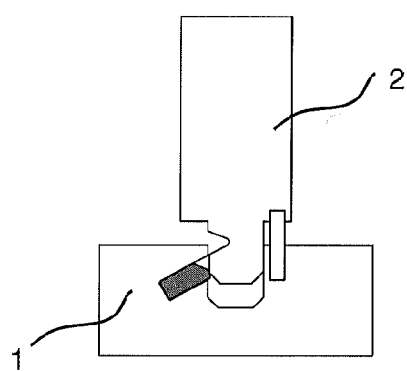
Figure 10C:
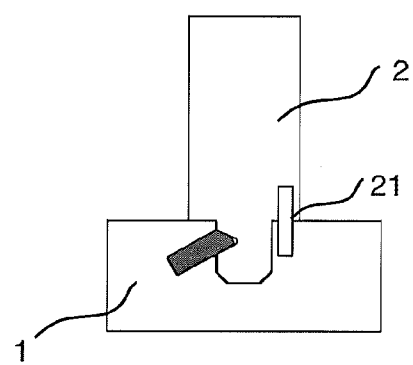

FIGS. 10a-10c show an embodiment of the invention further comprising a plug 21 of e.g. plastic, wood or metal at of the panels 1, 2 inserted into a hole, preferably at the edge of the other panel, The plug and the hole increases the strength of the connection and may be used to position the panels.

Figures 11A, 11B:
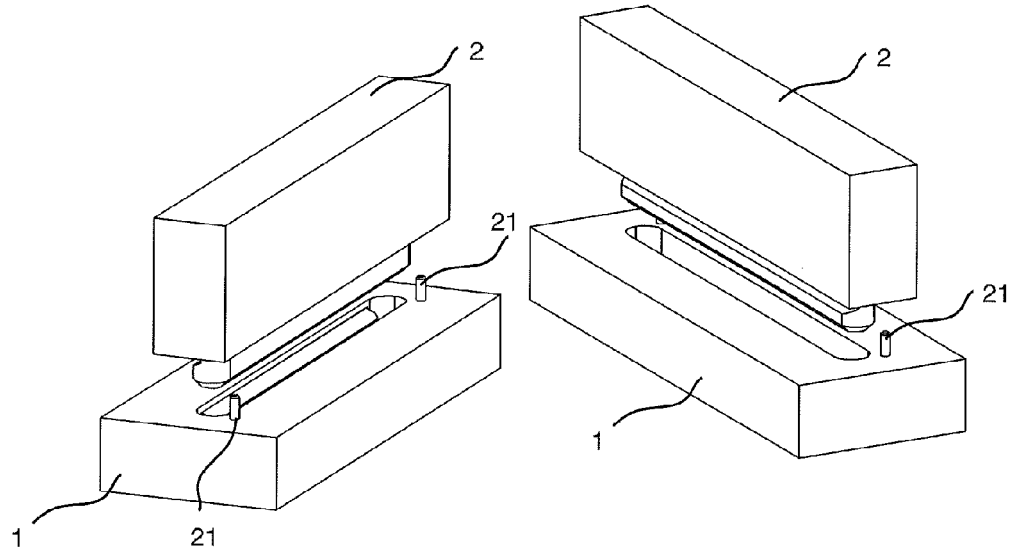
FIG. 11a-11d illustrate embodiments of the invention in a 3d view.
Figures 11C, 11D:
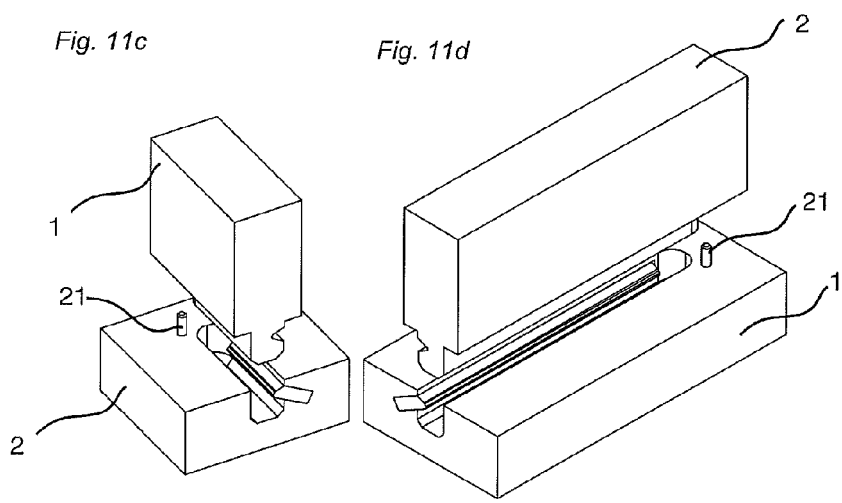

FIG. 11a-11b show the embodiment in FIG. 10a-c in a 3d view at two different angles and FIG. 11c-11d a cross section in a 3d view at two different angles.

Embodiments of the Invention

1. A set of panels (1,2) comprising a first (1) and a second panel (2), an edge (16) of the second panel is insertable into a groove (6) of the first panel (1), when the panels are arranged essential perpendicular to each other, to obtain a mechanical connection between the first and the second panel, when the second panel is displaced essentially perpendicularly to the first panel, wherein:

said edge (16) comprises a separate and flexible tongue (3) and said groove (6) comprises a tongue groove (5), or said edge (16) comprises a tongue groove (5) and said groove (6) comprises a separate and flexible tongue (3);

the separate and flexible tongue (3) is insertable into the tongue groove (5) for connecting said panels to each other in a first direction, which is parallel to a main plane (MP) of the first panel;

the edge (16) of the second panel is configured to cooperate with the groove (6) of the first panel for connecting said panels to each other in a second direction, which is parallel to a main plane (MP) of the second panel;

the length direction of the separate and flexible tongue (3) extends parallel with said edge and/or groove;

the groove (6) comprises an opening, two side walls (6b, 6c) and a bottom (6a);

the separate and flexible tongue (3) is arranged in an insertion groove (4);

the separate and flexible tongue has an inner part (9) mounted in the insertion groove (4) and an outer part (10) extending outside an opening of the insertion groove; and the flexible tongue is displaceable inwardly towards a bottom of the insertion groove (4) and outwardly into the tongue groove (5) during locking.

2. The set of panels as recited in embodiment 1, wherein the flexible tongue has two opposite displacement surfaces (3a, 3b) located between the inner and the outer parts, each of the two opposite displacement surfaces of the flexible tongue (3) are displaceable against an upper and a lower wall respectively of the insertion groove during locking, inwardly towards the bottom of the insertion groove (4) and outwardly into the tongue groove (5).

3. The set of panels as recited in embodiment 1 or 2, wherein the said insertion groove (4) is inclined upwards with the opening closer to the main plane (MP) of the panel than the inner part insertion groove (4).

4. The set of panels as recited in any of the preceding embodiments, wherein the insertion groove (4) is inclined such that an extension E of its lower part is located at or above the upper part of the opening of the groove (6).

5. The set of panels as recited in any of the preceding embodiments, wherein the second panel comprises an outer edge with a smaller thickness than the panel body (2) such that the panel body overlaps one or both parts of the groove (6) opening (27, 28) when the second panel (2) is inserted into the groove (6) of the first panel (1).

6. The set of panels as recited in any of the preceding embodiments, wherein the inner part of the tongue (9) comprises one or several flexible protrusions (8) extending in the length direction of the tongue (3).

7. The set of panels as recited in any of the preceding embodiments, wherein the insertion groove (4) is formed in the groove (6) of the first panel (1).

8. The set of panels as recited in any of the preceding embodiments, wherein the insertion groove (4) is inclined in relation to the main plane of the second panel with an angle of about 10-45 degrees.

9. The set of panels as recited in any of the preceding embodiments, wherein the panels comprises at least two flexible tongues separated from each other.

10. The set of panels as recited in any of the preceding embodiments, wherein the groove (6) is formed as a partial groove extending along a part of a panel.

11. The set of panels as recited in any of the preceding embodiments, wherein the panels are provided with a locking element (12) and a locking groove (14) for locking the panels parallel to the main plane (MP) of the first panel (1).

12. The set of panels as recited in any of the preceding embodiments, wherein adjacent outer panel edges (17,18) in a corner portion are inclined inwardly against the main plane (MP) of the panels.

13. The set of panels as recited in any of the preceding embodiments, wherein the tongue (3) is locked with pre tension against the tongue groove (5).

14. The set of panels as recited in any of the preceding embodiments, wherein the resilient parts are formed of an injection moulded plastic material.

15. The set of panels as recited in any of the preceding embodiments, wherein the first and/or the second panel comprise separate materials (24, 25) that form an edge or a groove portion.

16. The set of panels as recited in embodiment 15, wherein the separate material is covered with a foil.

The invention claimed is:

1. A set of panels comprising a first and a second panel, an edge of the second panel is essentially perpendicularly insertable into a groove of the first panel to obtain a mechanical connection between the first and the second panel, the second panel being displaceable essentially perpendicularly to the first panel, wherein:

the edge comprises a separate and flexible tongue and the groove comprises a tongue groove, or the edge comprises a tongue groove and the groove comprises a separate and flexible tongue;

the separate and flexible tongue is insertable into the tongue groove for connecting the panels to each other in a first direction, which is perpendicular to a main plane of the first panel;

the edge of the second panel is configured to cooperate with the groove of the first panel for connecting the panels to each other in a second direction, which is parallel to a main plane of the first panel;

the length direction of the separate and flexible tongue extends parallel with at least one of the edge and the groove;

the groove comprises an opening, two side walls and a bottom;

the separate and flexible tongue is arranged in an insertion groove;

the separate and flexible tongue has an inner part mounted in the insertion groove and an outer part extending outside an opening of the insertion groove; and the separate and flexible tongue is displaceable inwardly towards a bottom of the insertion groove and outwardly into the tongue groove during locking.

2. The set of panels as claimed in claim 1, wherein the separate and flexible tongue has two opposite displacement surfaces located between the inner and the outer parts, each of the two opposite displacement surfaces of the separate and flexible tongue is displaceable against an upper and a lower wall respectively of the insertion groove during locking, inwardly towards the bottom of the insertion groove and outwardly into the tongue groove.

3. The set of panels as claimed in claim 1, wherein the the insertion groove is inclined upwards with the opening closer to the main plane of the first panel than an inner part of the insertion groove.

4. The set of panels as claimed in claim 1, wherein the insertion groove is inclined such that an extension of a lower part of the insertion groove is located at or above an upper part of the opening of the groove.

5. The set of panels as claimed in claim 1, wherein the second panel comprises an outer edge with a smaller thickness than a panel body of the second panel such that the panel body overlaps at least one part of an opening of the groove when the second panel is inserted into the groove of the first panel.

6. The set of panels as claimed in claim 1, wherein the inner part of the separate and flexible tongue comprises one or several flexible protrusions extending in the length direction of the separate and flexible tongue.

7. The set of panels as claimed in claim 1, wherein the insertion groove is formed in the groove of the first panel.

8. The set of panels as claimed in claim 1, wherein the insertion groove is inclined in relation to the main plane of the second panel with an angle of about 10-45 degrees.

9. The set of panels as claimed in claim 1, wherein the panels comprises at least two flexible tongues separated from each other.

10. The set of panels as claimed in claim 1, wherein the groove is formed as a partial groove extending along a part of a panel.

11. The set of panels as claimed in claim 1, wherein the panels are provided with a locking element and a locking groove for locking the panels parallel to the main plane of the first panel.

12. The set of panels as claimed in claim 1, wherein adjacent outer panel edges in a corner portion are inclined inwardly against the main plane of the panels.

13. The set of panels as claimed in claim 1, wherein the separate and flexible tongue is locked with pre tension against the tongue groove.

14. The set of panels as claimed in claim 1, wherein the separate and flexible tongue includes resilient parts that are formed of an injection moulded plastic material.

15. The set of panels as claimed in claim 1, wherein at least one of the first and the second panel comprise separate materials that form an edge or a groove portion.

16. The set of panels as claimed in claim 15, wherein the separate material is covered with a foil.

* * * * *